United States Patent [19]

Kadota et al.

[11] 4,045,773
[45] Aug. 30, 1977

[54] PATTERN SEGMENTING SYSTEM FOR A PATTERN RECOGNIZING DEVICE

[75] Inventors: Shozo Kadota; Yoshiji Fujimoto, both of Hachioji; Michio Yasuda, Koganei; Mitsunori Oka, Hatano, all of Japan

[73] Assignee: Hitachi, Ltd., Japan

[21] Appl. No.: 631,620

[22] Filed: Nov. 13, 1975

[30] Foreign Application Priority Data

Nov. 13, 1974  Japan ............................. 49-129965

[51] Int. Cl.$^2$ ............................................. G06K 9/02
[52] U.S. Cl. .......................................... 340/146.3 SG
[58] Field of Search ........... 340/146.3 SG, 146.3 AG, 340/146.3 H, 146.3 A

[56] References Cited

U.S. PATENT DOCUMENTS

| | | | |
|---|---|---|---|
| 3,111,646 | 11/1963 | Harmon | 340/146.3 SG |
| 3,526,876 | 9/1970 | Baumgartner et al. | 340/146.3 SG |

Primary Examiner—Joseph M. Thesz
Attorney, Agent, or Firm—Craig & Antonelli

[57] ABSTRACT

A pattern segmenting system for a pattern recognizing device, including a pattern memory for storing character information, means for reading out the character information from the pattern memory, means for detecting the start and end points of a subpattern in the character information and for calculating the center of the subpattern in accordance with the start and end points thereof, means for deciding whether or not the center thereof is within a selected character frame, and means for segmenting the subpattern when the center thereof is within the selected character frame and for regarding the frame as a blank when it is not within the selected character frame.

8 Claims, 17 Drawing Figures

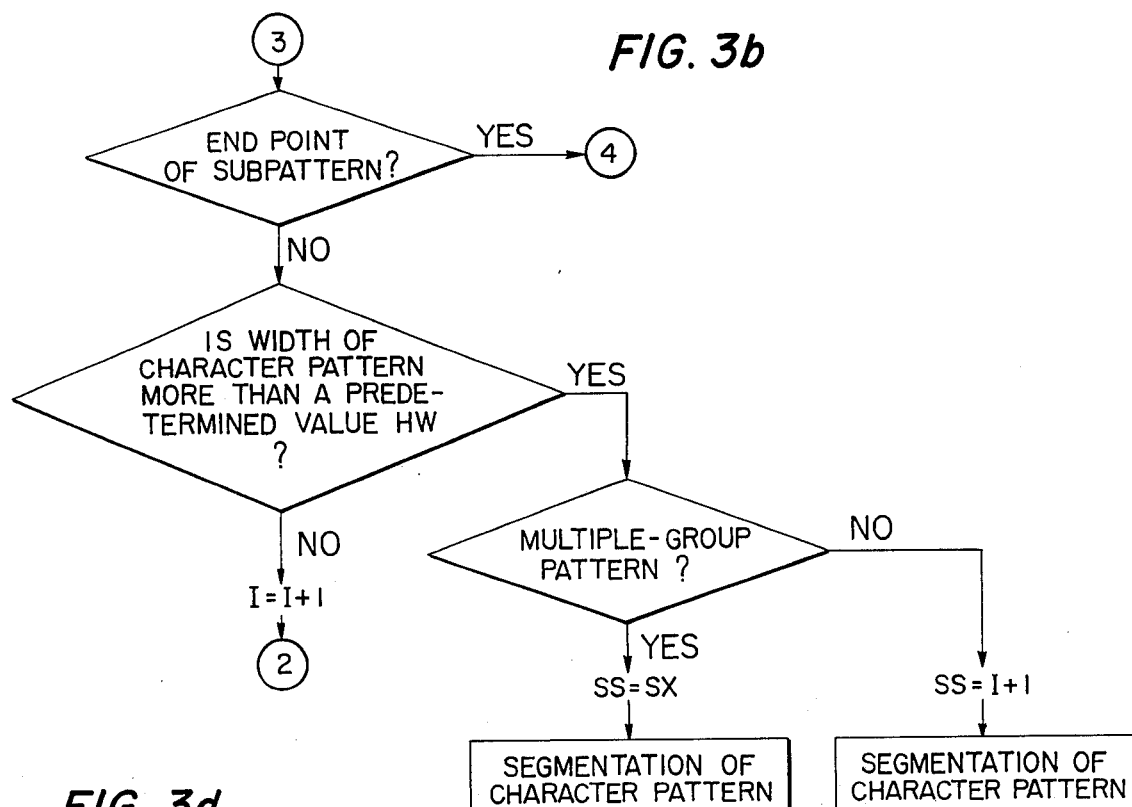
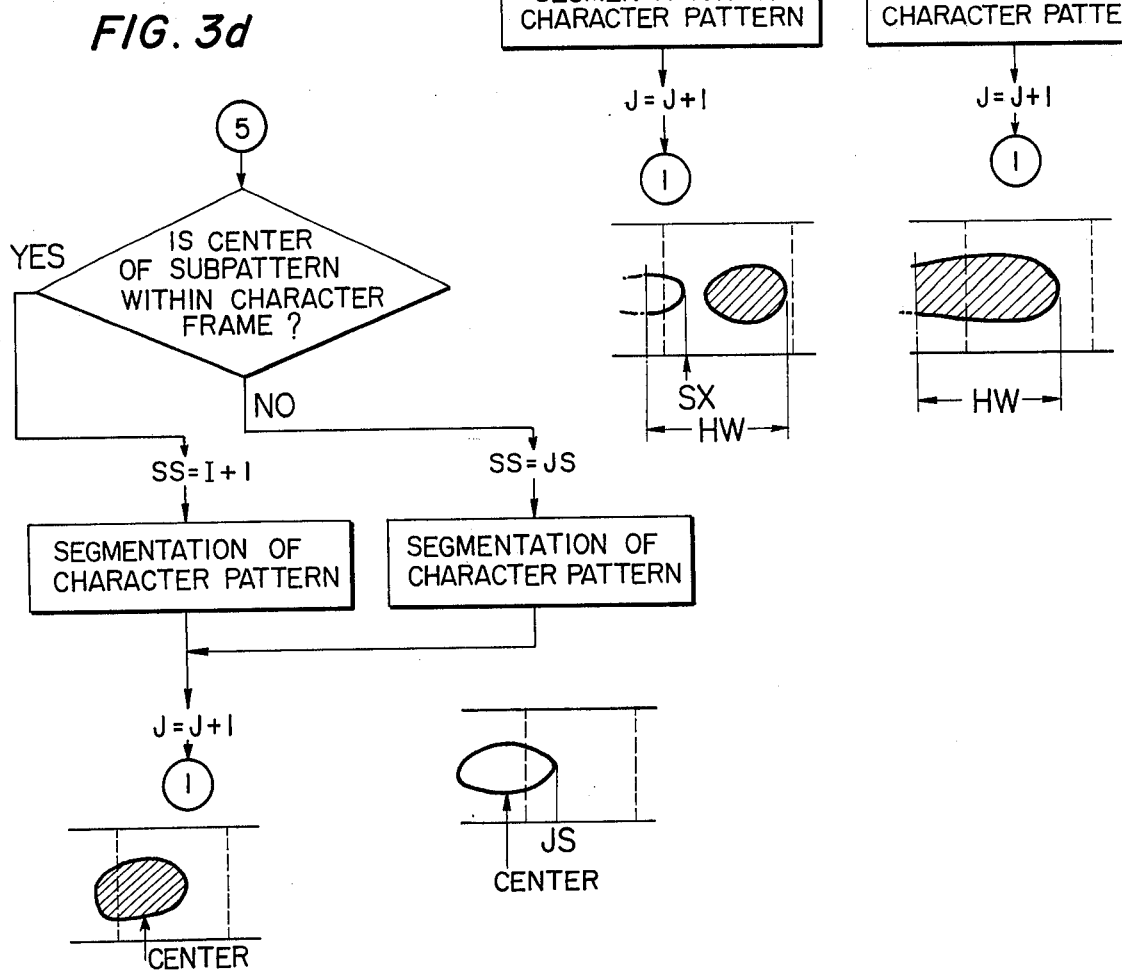
FIG. 3b
FIG. 3d

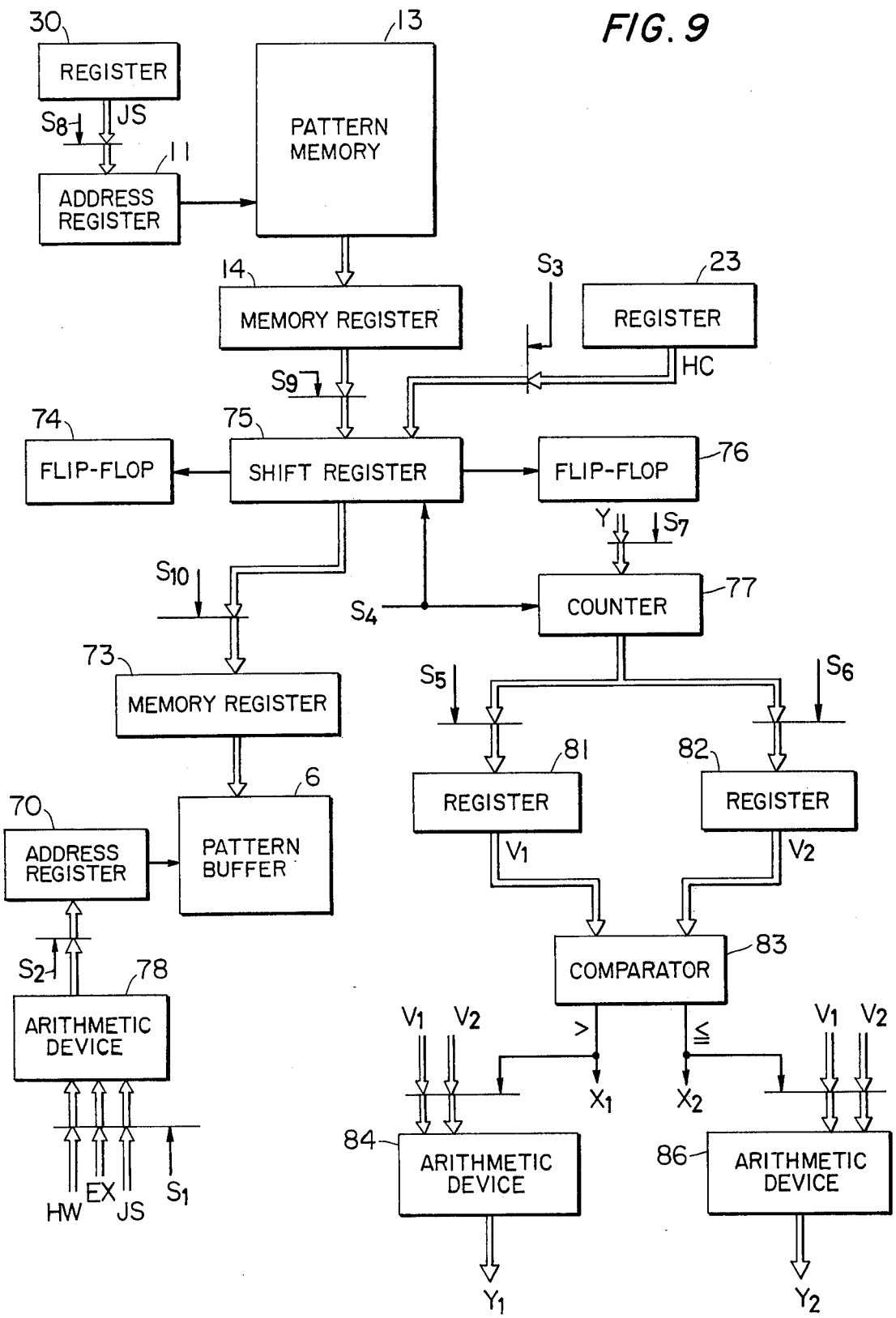

PATTERN SEGMENTING SYSTEM FOR A PATTERN RECOGNIZING DEVICE

BACKGROUND OF THE INVENTION

This invention relates to a pattern segmenting system for a pattern recognizing device such as an optical character reader.

In order to recognize characters written on a sheet, it is necessary to photoelectrically convert the characters into binary information (1 or 0) according to whether it is a part of the character or a part of the background and to successively segment the characters.

In a prior art device, the character is segmented either for each character frame with a predetermined width, or, when blank information is successively detected, during a period which spans several scanning lines. The former has the disadvantage that all characters in a character line are erroneously segmented if the top position of the character line is recognized incorrectly. The latter has a disadvantage in that a character which has a blank portion in the middle, such as a katakana "/\", is segmented into two parts such as parts " / " and " \ ". Furthermore, in the prior art device, it is impossible to segment or recognize the information in a character frame as a blank when a character is not present in the character frame.

In order to recognize a program in a coding sheet, it is necessary to recognize the blank. For example, in a Fortran program, a comment notation or $ mark is written in a first column, statement numbers are written in the second to fifth columns, a continuation mark is written in the sixth column and statements are written in the seventh and subsequent columns. Therefore, it is impossible to recognize the program if the position of the columns is not recognized. Furthermore, when a character pattern includes a noise, there is the possibility of erroneously segmenting the character pattern.

SUMMARY OF THE INVENTION

An object of this invention is to correctly segment a pattern which has a blank portion in the middle.

Another object of this invention is to recognize the pattern frame as a blank when a pattern is not present in the pattern frame.

In order to attain such objects, a feature of this invention is to provide a pattern segmenting system comprising a memory for storing at least one pattern, means for reading out the pattern from the memory, means for detecting the start and end points of a subpattern which is derived from the read out pattern and for calculating the center point of the subpattern in accordance with the start and end points thereof, means for deciding whether or not the center point thereof is within a supposed frame, and means for segmenting the subpattern as a pattern in the selected frame when the center point is within the supposed frame.

These and other objects, features, and advantages of this invention will become more apparent from the following description when taken in connection with the accompanying drawings which show, for purposes of illustration only, several embodiments in accordance with this invention.

BRIEF DESCRIPTION OF THE DRAWINGS

FIGS. 3a to 3d are flow charts showing operating procedures of a pattern segmenting system according to this invention.

FIGS. 5 to 9 are diagrams showing specific constructions of the respective parts of the pattern segmenting system shown in FIG. 4.

DETAILED DESCRIPTION OF THE INVENTION

Figure 1:
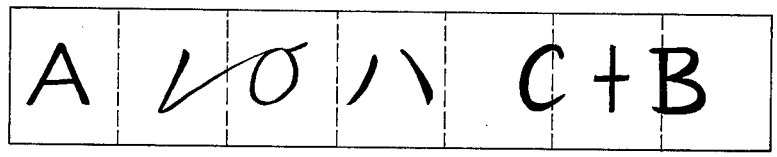
FIG. 1 is a diagram showing a relationship between written characters and character frames.

FIG. 1 shows an original pattern stored in a pattern memory. The broken lines in FIG. 1 represent the lines of the selected frames. The interval of the lines may be decided by a previously determined value or by a position signal inserted before each pattern signal. It is assumed that patterns are scanned from right to left.

Figure 2A:
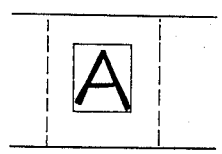
FIGS. 2a to 2f are diagrams showing various examples of relationships between written characters and character frames.

FIG. 2a shows an example of a character that is within a supposed frame. In such a case, the start and end points of this character are detected, and the character is stored in a desired area of a pattern buffer so that the center of the character coincides with the center of the area.

Figure 2B:
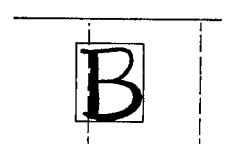

FIG. 2b shows an example of a character that protrudes beyond the left terminal of a supposed frame. This character is scanned beyond the left terminal thereof and is segmented when the end point of this character is detected. In order to detect the frame to which this character belongs, it is first determined where the center of this character belongs. This character is, thereby, segmented as it is within a frame to which the center thereof belongs.

Figure 2C:
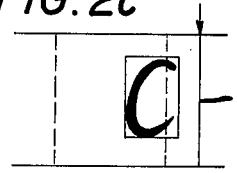

FIG. 2c shows an example of a character that protrudes beyond the right terminal of a supposed frame. If segmentation of this character is started from the right terminal of the supposed frame, only a part of this character is segmented. Therefore, scanning of this character is started from a point subsequent to the end point of a preceding character.

Figure 2D:
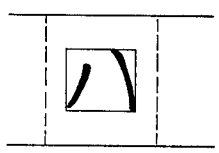

FIG. 2d shows an example of a character that is divided into two partial patterns, each of which is hereinafter called a subpattern. That is, the subpattern cooperates with another subpattern to form a single pattern. If two subpatterns are within a frame, when the end terminal of the frame is scanned, these subpatterns are segmented as a character.

Figure 2E:
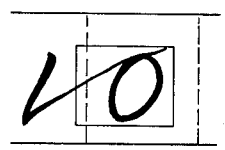

FIG. 2e shows an example of two characters that are connected together. The characters are divided at a point which is spaced by a predetermined width (in the scanning direction) from the right terminal of the frame, and the character in the frame surrounded by the solid line is then segmented.

Figure 2F:
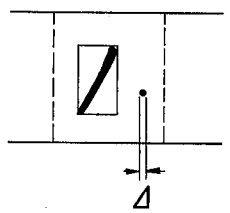

FIG. 2f shows an example of a pattern that includes noise. If the size of subpattern of this pattern is smaller than a predetermined value, this subpattern is determined to be noise and is ignored.

FIGS. 3a to 3d show operation procedures including the above-mentioned processing. In FIGS. 3a to 3d, symbol SS represents the position of a scanning point from which segmentation of one character is started, symbol I the scanning line position of a scanning point which being scanned, symbol J the number of a character which is segmented, symbol JS the position of the start point of a character pattern, and symbol SX the position of the start point of a character subpattern. It is assumed that SS and J are zero at an initial condition.

Figure 3A:
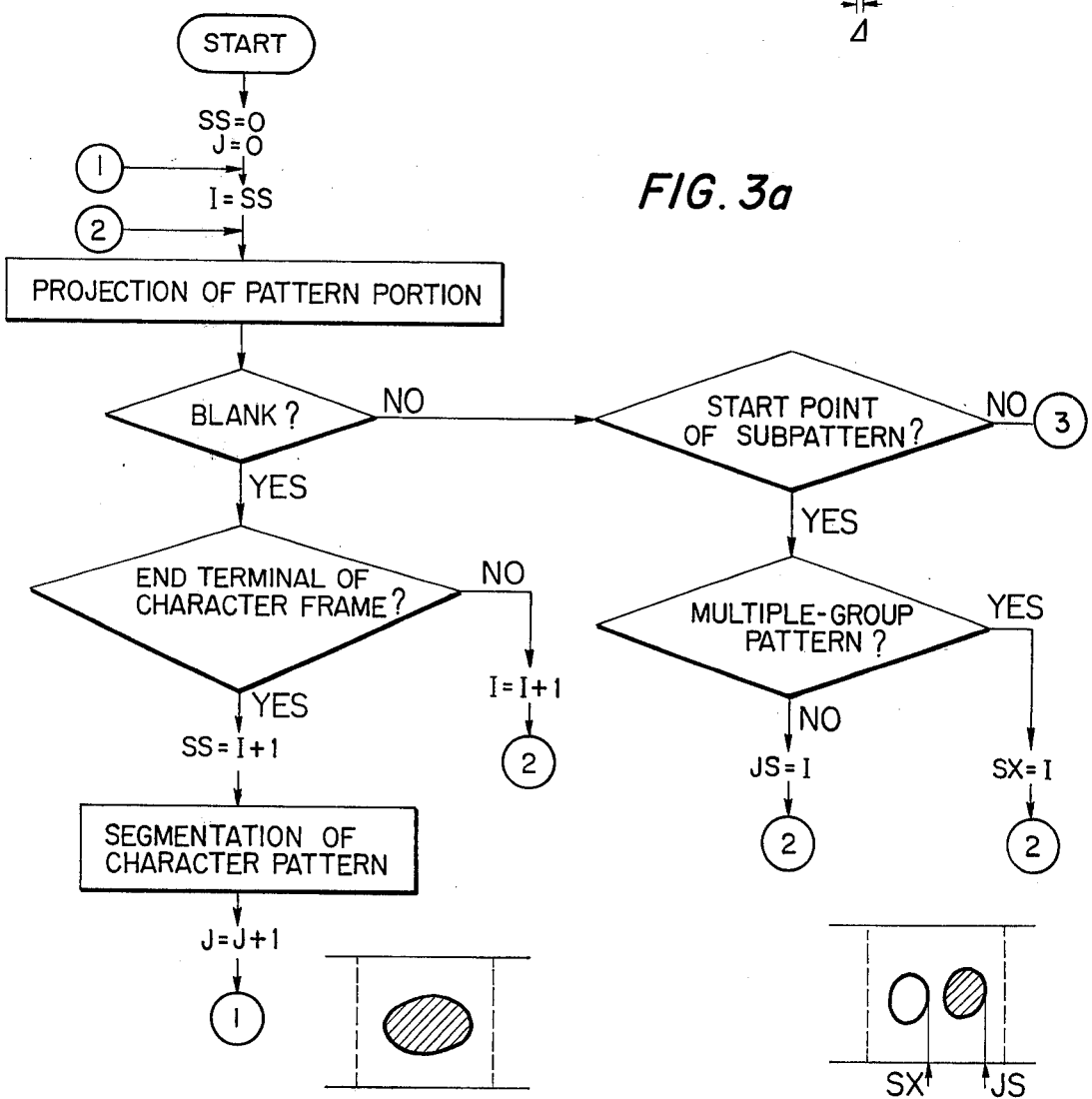

Vertical scanning is started from SS (1 = SS), that is, the right terminal of a character to be segmented (SS = 0) as shown in FIG. 3a. The scanned pattern portion is projected, and it is detected whether or not an information 1 is in the scanned pattern portion. In other words, it is checked to determine whether or not the scanned pattern portion is a blank.

If the scanned pattern portion is a blank, it is determined whether or not the scanning position has arrived at the end terminal of a character frame. The end terminal of the character frame is detected by counting the number of scanning lines and by checking to see whether that counted result is beyond the value of the end terminal of the character frame. If scanning has not arrived at the end terminal of the frame, I is incremented by one and vertical scanning of a subsequent line of the character portion is executed. These operations are repeated.

When the scanned pattern portion is a blank and the scanning position arrives at the end terminal of the frame, the character J in the frame is segmented after setting SS = I + 1. This character is segmented so that the center of the character determined from the start and end points thereof coincides with the center of a desired area in a pattern buffer. When the character is segmented, J is incremented by one (J + 1) and segmentation of a subsequent character is executed by starting scanning from SS.

If the information 1 is detected within the scanned pattern portion after detection of a blank pattern portion, the scanning position is determined to be the start point of a subpattern (block) or the middle thereof. When the scanning position is the start point of a subpattern, discrimination is made between a multiple-group pattern and a single-group pattern in accordance with presence or absence of another scanned subpattern. The "multiple-group pattern" represents one of the subpatterns which constitute a character pattern and the "single-group pattern" represents a subpattern which constitutes a character pattern. SX = I is set if the multiple-group pattern is present and JS = I is set if the single-group pattern is present.

When the scanning position is neither the start point of a subpattern nor the end point thereof, it is determined whether or not the width of a character pattern is more than a predetermined value, as shown in FIG. 3b. When the width of this character pattern is not more than a predetermined value, scanning is repeated after incrementing I by one. When the width of the character pattern is more than a predetermined value, it is determined whether or not a subpattern is a multiple-group pattern. If the multiple-group pattern is present, the scanned subpattern (except for a subpattern which is scanned at present) is segmented as a character pattern. Scanning of a subsequent character pattern is started from SS = SX after incrementing J by one. If a subpattern is not a multiple-group pattern, it is seen that two character patterns are connected together. Therefore, the subpattern is segmented by dividing it into two at the time. Scanning of a subsequent character pattern is started from SS = I + 1 after incrementing J by one.

Figure 3C:
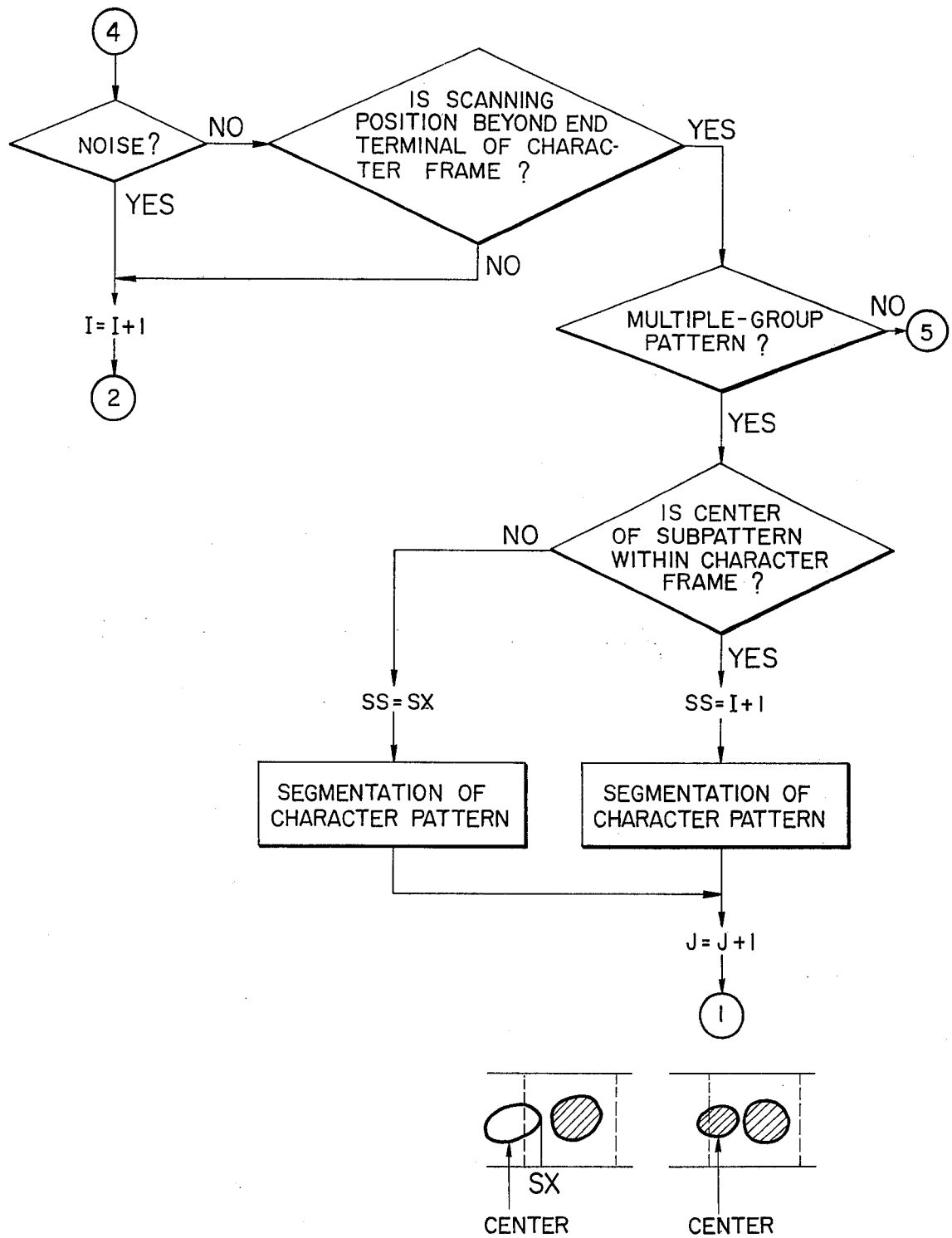

When the scanning position reaches the end point of a subpattern before the subpattern is beyond the end terminal of a frame, it is determined whether or not the subpattern is a noise, as shown in FIG. 3c. The noise is a subpattern of small height and width. Values of these height and width are set as parameters. When the subpattern is a noise, scanning is continued by incrementing I by one. When the subpattern is not a noise, it is determined whether or not the scanning position is beyond the end terminal of a frame. When the scanning position is not beyond the end terminal of the frame, the scanning is continued by incrementing I by one since there is the possibility that another subpattern is within the frame.

When the scanning position is beyond the end terminal of a frame, it is checked whether or not a character pattern is a multiple-group pattern. If this character pattern is a multiple-group pattern, it is determined whether or not the center of the last subpattern is within a frame. If the center is within the frame, all subpatterns in the frame are segmented as a character pattern. Scanning of a subsequent character pattern is then started from SS = I + 1 after incrementing J by one. If the center of the last subpattern is not within the frame, it is regarded that this last subpattern is not a pattern within the frame but a part of a subsequent character pattern. Therefore, the pattern portion (except for the last subpattern) is segmented as a character pattern. Scanning of the subsequent character pattern is then started from SS = SX after incrementing J by one.

When the scanning position is beyond the end terminal of a frame and a character pattern is not a multiple-group pattern, it is checked whether or not the center of the last subpattern is within a frame, as shown in FIG. 3d. If the center thereof is within the frame, this last subpattern is segmented as a character pattern. Scanning of a subsequent character pattern is started from SS = I + 1 after incrementing J by one.

If the center is not within the frame, it is regarded that no character pattern is present within the frame. Therefore, it is determined that a blank is present in the frame. Scanning of a subsequent character pattern is then started from SS = JS after incrementing J by one.

Figure 4:
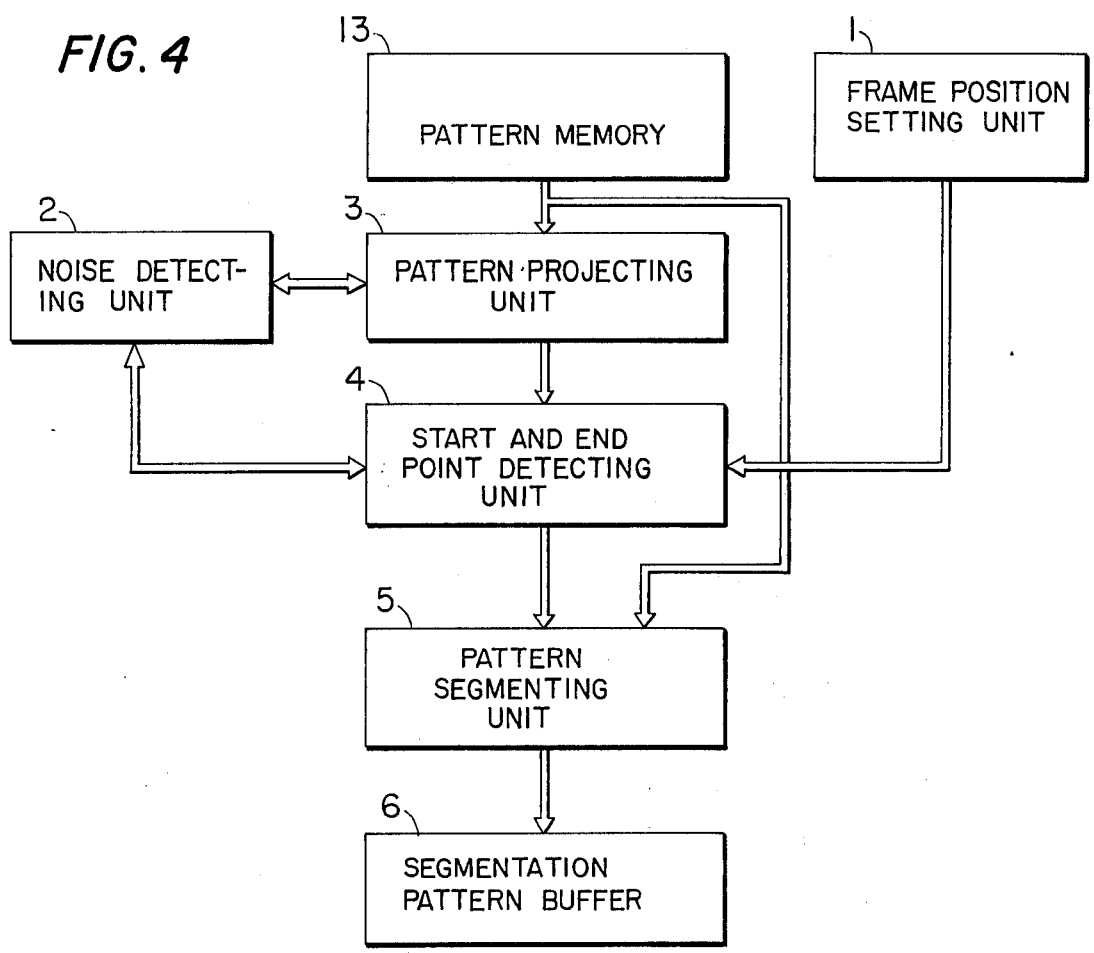
FIG. 4 is a schematic block diagram showing an embodiment of a pattern segmenting system according to this invention.

FIG. 4 shows an embodiment of a pattern segmenting system according to this invention. In FIG. 4, numeral 1 represents a unit for setting the end terminal position of a character frame, numeral 2 a noise detecting unit, numeral 3 a pattern projecting unit, numeral 4 a start and end point detecting unit, numeral 5 a pattern segmenting unit, numeral 6 a segmentation pattern buffer, and numeral 13 a pattern memory.

All character patterns (original patterns) of one character line are stored in the pattern memory 13 and are then segmented in order. If information necessary to execute segmentation is previously stored in the pattern memory 13, the segmentation process is started even if all character patterns of one character line are not stored in the pattern memory 13. The top point of information of one character line is detected, and the information is then stored in order.

Pattern information read out from the pattern memory 13 is projected by the pattern projecting unit 3. In the start and end point detecting unit 4, the start and end points of each subpattern are detected by the pattern information read out from the pattern memory 13. The center of the subpattern is calculated in accordance with the detected start and end points. Furthermore, in this unit 4, it is decided whether or not the center of the subpattern is within a supposed character frame in response to the end terminal position of the pattern frame from the setting unit 1. The indication that a subpattern is segmented as a character in the supposed character frame or in the subsequent frame in response to whether or not the center of the subpattern is within the supposed character frame, is transferred to the pattern segmenting unit 5.

In the unit 5, the pattern information is segmented for each character pattern in response to the indication from unit 4. The segmented pattern is stored in the pattern buffer 6 so that the center of this pattern coincides with the center of a desired area of the pattern buffer 6.

In the noise detecting unit 2, a subpattern is regarded as noise when the interval between the start and end points of the subpattern is narrower than a predetermined value. Therefore, the corresponding projection result in the pattern projecting unit 3 is reset to zero.

The above-mentioned operations are part of the functions performed by a system shown in FIG. 4. This system can execute various functions of the type shown in FIGS. 3a to 3d.

Figure 5:
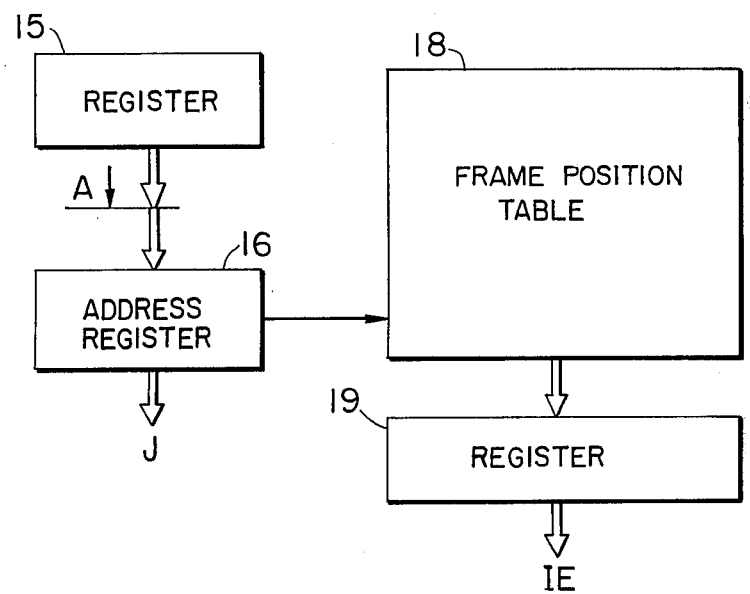

FIG. 5 shows a specific example of an embodiment of the setting unit 1 shown in FIG. 4. The end terminal position of a character frame can be obtained by counting the number of scanning lines if the width of a character frame is constant. When the width of a character frame is variable, the end terminal position of a character pattern can be obtained by referring to a table.

In FIG. 5 the end terminal positions corresponding to the respective character frames are previously stored in a table 18. Segmentation character number J stored in a register 15 is transferred to an address register 16. The end position information IE corresponding to the character number J, that is, the frame number, is read out from the table 18 and is stored in a memory register 19.

Figure 6:
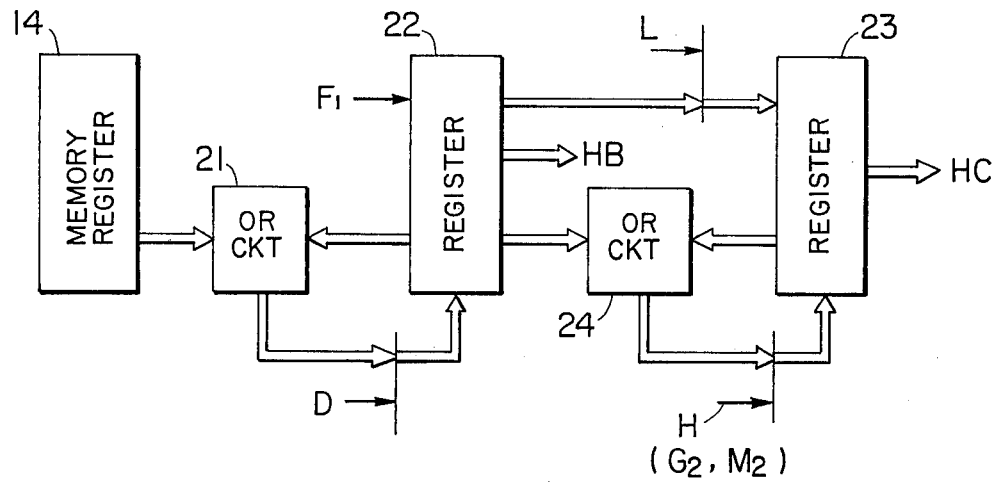

FIG. 6 shows a specific example of an embodiment of the pattern projecting unit 3 shown in FIG. 4. In FIG. 6, a memory register 14 stores pattern information read out from the pattern memory 13. Registers 22 and 23 store the projection result information HB and HC of a subpattern and a character pattern, respectively.

Figure 7:
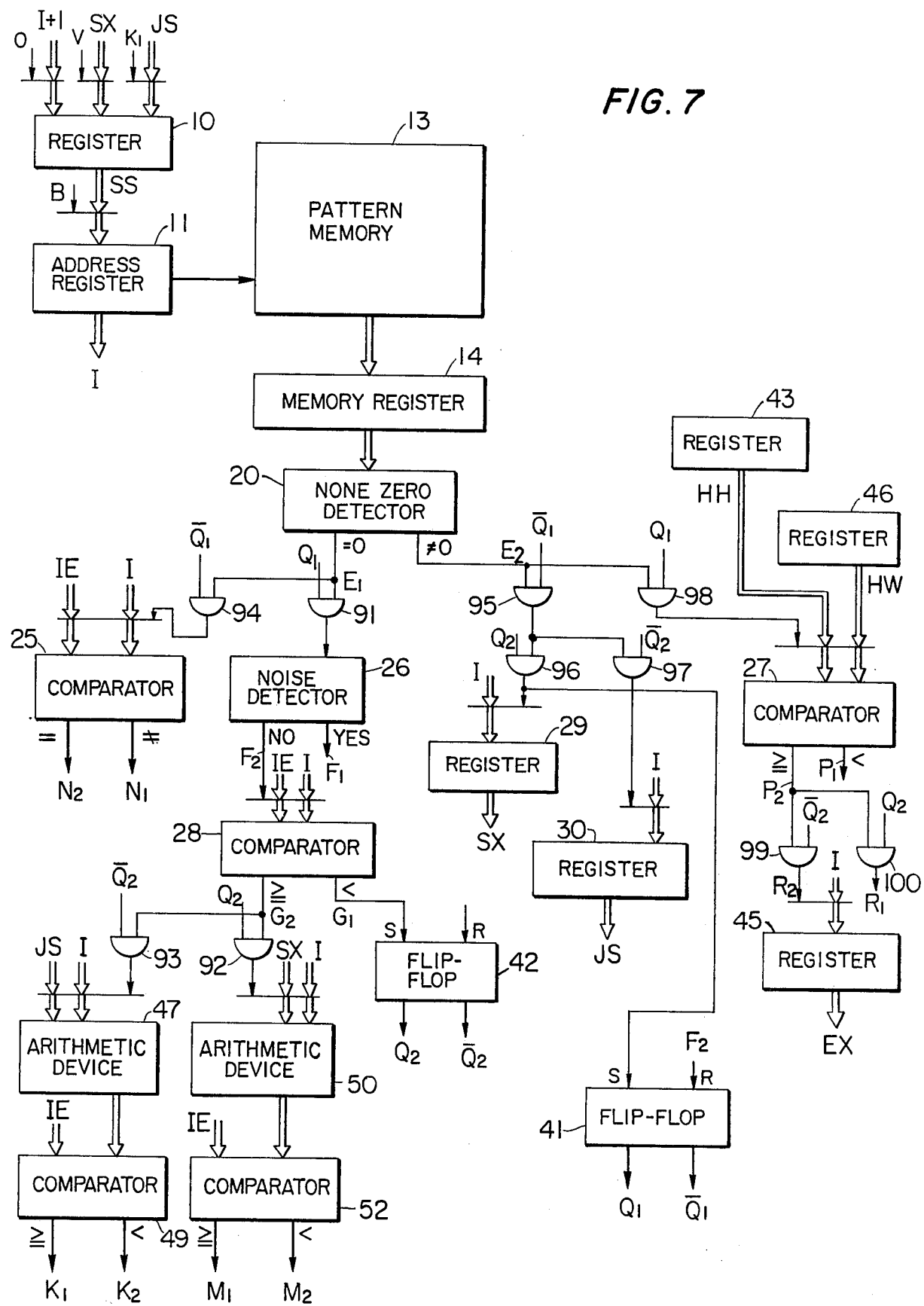

FIG. 7 shows an embodiment of the start and end point detecting unit 4 shown in FIG. 4. In FIG. 7, the pattern memory 13 stores pattern information as described above. It is assumed that pattern information corresponding to one scanning line is stored as one word in the pattern memory 13.

A register 10 stores a scanning start address of each character pattern stored in pattern memory 13. It is reset when segmentation of each character line is started. A register 11 stores an address for the data stored in the pattern memory 13. It is assumed that the content of this register 11 is increased by one whenever pattern information of one scanning line is read out from the pattern memory 13.

A none zero detector 20 detects whether or not the content of the memory register 14 is only zero. A register 43 stores scanning distance data HH from the start point of a character pattern. The content of this register 43 is increased by one for every scanning after detecting the start point. A register 46 stores predetermined width data HW of a character. Register 29 and 30 store the start points SX and JS of a subpattern and a character pattern, respectively. A register 45 stores the end point EX of a character pattern.

A flip-flop 41 indicates that the character pattern portion is detected. This flip-flop 41 is set when the start point of a subpattern is detected and is reset when the end point of this subpattern is detected. A flip-flop 42 indicates that a multiple-group pattern is present. This flip-flop 42 is reset at first and is set when the end point of a first subpattern is detected.

A noise detector 26 detects a noise in pattern information. Numerals 25, 27, 28, 49, and 52 represent comparators and numerals 47 and 50 represent arithmetic devices.

Operations of FIGS. 5 to 7 are explained in detail hereinafter. It is assumed that segmentation is started from the top of the pattern information of each character line. The top address corresponding to the segmentation character number J stored in register 15 is transferred to register 16 by a signal A as shown in FIG. 5. The content stored in the table 18 is read out in accordance with the address in register 16 and is transferred to register 19. Therefore, the content IE of register 19 represents the end terminal position of a character frame corresponding to a character pattern to be segmented. Register 10 shown in FIG. 7 and registers 22 and 23 shown in FIG. 6 are previously reset.

At the next step, the scanning start address SS (=0) stored in register 10 is transferred to register 11 by a signal B as shown in FIG. 7. The pattern information of one vertical scanning line is read out from the pattern memory 13 in accordance with the address in register 11 and is transferred to memory register 14.

In the unit shown in FIG. 6, an OR circuit 21 obtains the logical OR result between the contents of registers 14 and 22. The result of the logical OR operation is stored in register 22 in response to a signal D, therefore, the register 22 stores the content of register 14. On the other hand, whether or not the content of register 14 is zero is checked by the none zero detector 20 shown in FIG. 7. Signal $E_1$ or $E_2$ is obtained from this detector 20 in response to whether or not the content of register 14 is all zero.

Signal $E_1$ represents that condition where the pattern information of a vertical scanning line read out from the pattern memory 13 is blank information. Recalling that flip-flop 41 is set to produce output $Q_1$ at the time a character is detected, when signal $E_1$ and the output $Q_1$ of flip-flop 41 are applied to an AND gate 91, that is, when the content of register 14 is zero and flip-flop 41 is set, the end of a pattern portion is detected and the noise detector 26 is operated. It is determined by the noise detector 26 whether or not the detected pattern portion is a noise by determining the width of the pattern portion. If it is a noise, register 22 shown in FIG. 6 is reset by a signal $F_1$ from detector 26. Furthermore, the content of register 11 is increased by one.

If it is not a noise, it is regarded that the end point (left terminal) of a subpattern is scanned. Therefore, flip-flop 41 is reset by a signal $F_2$ from detector 26.

At the same time, it is determined by comparator 28 whether or not the left terminal of the subpattern is beyond the end terminal (left terminal) of a character frame.

Signal I from register 11 and signal IE from register 19 are applied to comparator 28 in response to signal $F_2$. If $I \geq IE$, the end point of the subpattern is beyond the end terminal of the character frame. If $I < IE$, the end point of the subpattern is not beyond the end terminal of the frame. In such a case, there is the possibility that the scanned character pattern is a multiple-group pattern. Therefore, flip-flop 42 is set by a signal $G_1$ from comparator 28. At the same time, OR circuit 24 obtains a logical OR result between the contents of registers 22 and 23. The result of the logical OR operation is transferred to register 23 by a signal H ($G_1$). Therefore, register 33 stores the content of register 22. Furthermore, register 22 is reset and the content of register 11 is increased by one.

When the end point of the subpattern is beyond the end terminal of the character frame (I ≧ IE), the character frame to which this subpattern belongs is determined. If a reset signal $\overline{Q_2}$ of flip-flop 42 is applied to an AND gate 93, that is, if the subpattern is not a multiple-group pattern, signals JS and I are applied to arithmetic device 47. In this device 47, (I + JS)/2 is obtained. The output signal of the device 47 and signal IE are compared with each other by comparator 49.

If (I + JS)/2 ≧ IE, the center of a character pattern is over the frame. Therefore, it is regarded that this character pattern belongs to a subsequent frame. In this case the content JS of register 30 is transferred to register 10 by a signal $K_1$ from comparator 49. Therefore, the frame is regarded as a blank.

If (I + JS)/2 < IE, the center of a character pattern is within a frame. In this case it is regarded that this pattern belongs to this frame. The content of register 22 is therefore transferred to register 23 by a signal L ($K_2$) from comparator 49 and the content HC of register 23 is then transferred to the pattern segmenting unit 5. The signal I + 1 is stored in register 10 by a signal 0 ($K_2$). If a set signal $Q_2$ of flip-flop 42 is applied to an AND gate 92, that is, if the subpattern is a multiple-group pattern, signals SX and I are applied to arithmetic device 50. It is checked whether or not the center of the last subpattern is within a frame. In this device 50 the result (I + SX)/2 is obtained. This result is compared with signal IE by comparator 52.

If (I + SX)/2 ≧ IE, the center of this subpattern is over the frame. Therefore, it is regarded that this subpattern belongs to a subsequent frame. The content SX of register 29 is transferred to register 10 by a signal V corresponding to a signal $M_1$ from comparator 52 and register 22 is reset. The content of register 23 shown in FIG. 6 is transferred to the pattern segmenting unit 5 shown in FIG. 4. That is, the remainder subpattern except for the last subpattern is segmented.

If (I + SX)/2 < IE, the center of the subpattern is within the frame. Therefore, OR circuit 24 obtains a logical OR result between the contents of registers 22 and 23. The result thereof is transferred to register 23 by a signal H ($M_2$). The content of register 23 is transferred to the pattern segmenting unit. That is, all subpatterns in the frame are segmented. Furthermore, signal I + 1 is stored in register 10 by signal 0 ($M_2$).

When signals $E_1$ and $\overline{Q_1}$ are applied to an AND gate 94, that is, when the content of register 14 is zero and a character pattern is not detected, signals I and IE are applied to comparator 25. In comparator 25, signal I is compared with signal IE in order to check whether scanning position reaches the end terminal of the frame.

IF I ≠ IE, it is clear that the scanning position does not yet reach the end terminal of the frame. Scanning is continued by increasing the content of register 11 by one in response to a signal $N_1$.

If I = IE, then the scanning position reaches the end terminal of the frame. Therefore, the content of register 22 is transferred to register 23 by a signal L ($N_2$) and, further, is transferred to the pattern segmenting unit. If a character pattern is detected, this character pattern is segmented. If a character pattern is not detected, a blank is is determined to be present.

When signals $E_2$ and $\overline{Q_1}$ are applied to an AND gate 95, the output of this gate 95 indicates that the start point (right terminal) of a character pattern is detected.

In such a case, if a set signal $Q_2$ of flip-flop 42 is applied to an AND gate 96, the output of this gate 96 indicates that the start point of a multiple-group pattern is detected. The content I of register 11 is stored in register 29 by the output of gate 96. At the same time, flip-flop 41 is set. When a reset signal $\overline{Q_2}$ of flip-flop 42 is applied to an AND gate 97, the output of this gate 97 indicates that the start point of a character pattern (single-group pattern) is detected. The content I of register 11 is stored in register 30 by the output of gate 97.

When signals $E_2$ and $Q_1$ are applied to an AND gate 98, the output of this gate 98 indicates a character pattern portion is scanned at present. Therefore, it is checked whether or not the width of the pattern portion is more than a predetermined value in order to divide the pattern into two when character patterns are connected together. In this case the contents HH and HW are applied to comparator 27 by the output of gate 98 and are compared with each other.

If HH < HW, the middle of the character pattern is scanned. Therefore, the contents of registers 11 and 43 are increased by one, respectively, in response to a signal $P_1$ from comparator 27.

If HH ≧ HW, the character patterns are connected together. If the reset signal $\overline{Q_2}$ of flip-flop 42 is applied to an AND gate 99, the content I of register 11 is transferred to register 45 by the output $R_2$ of gate 99. Signal I + 1 is stored in register 10 by signal 0 ($R_2$). If set signal $Q_2$ of flip-flop 42 is applied to an AND gate 100, the content SX of register 29 is stored in register 10 by signal V corresponding to the output signal $R_1$ of gate 100.

Figure 8:
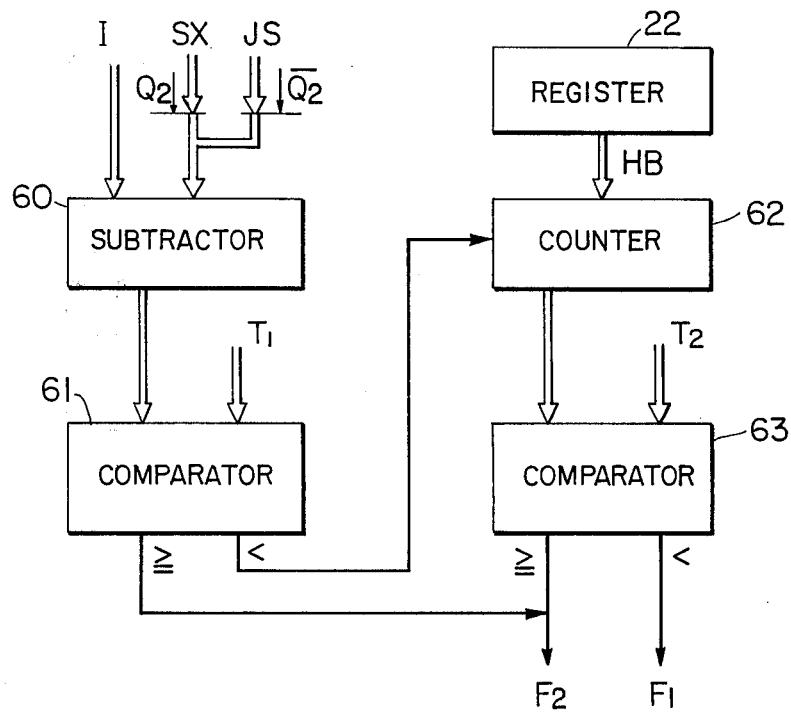

FIG. 8 shows an example of an embodiment of the noise detector 26 shown in FIG. 7. In FIG. 8 numeral 60 represents a subtractor. Numerals 61 and 63 comparator and numeral 62 a counter. When a pattern portion is a single-group pattern, signal JS is applied to the subtractor 60 by signal $\overline{Q_2}$. The signal I − JS is obtained by the subtractor 60. The output of subtractor 60 is compared with a given parameter $T_1$ (for example, 3 ) by comparator 61. IF I − JS < $T_1$, the number of signals 1 in register 22 is counted by the counter 62 in accordance with a signal from comparator 61. The output of the counter 62 is compared with a given parameter $T_2$ by comparator 63. If information 1 is present more than $T_2$ times (for example, 3), the pattern portion is regarded as a character pattern. If the information 1 is not present more that $T_2$ times, the pattern portion is regarded as noise. Signal $F_1$ or $F_2$ is obtained in response to a noise or a character pattern.

If I − JS ≧ $T_1$, signal $F_2$ is obtained from comparator 61. When a pattern portion is a multiple-group pattern, signal SX is applied to the subtractor 60 by signal $Q_2$. Subsequent operations are similar to such operations as described above. Therefore, a detailed description thereof is not repeated.

FIG. 9 shows an example of an embodiment of the pattern segmenting unit 5 shown in FIG. 4. Before segmentation of a character pattern, the start point JS and end point EX of this character pattern is obtained by registers 30 and 45, respectively, as shown in FIG. 7.

At first, a desired area of the segmentation pattern buffer 6 is cleared. A store starting address is calculated by an arithmetic device 78 in order to effect coincidence between the center in the horizontal direction of the character pattern and the center of a desired area in the pattern buffer 6. Signals HW, EX and JS are applied to arithmetic device 78 by a signal $S_1$. In this device 78, [HW − (EX−JS)]/2 is obtained. The output of the device 78 is applied to an address register 70 by a signal $S_2$.

The content HC of register 23 indicates that a signal 1 is present in the respective portions of the vertical scanning lines in a particular frame. Therefore, at the next step, the content HC of register 23 is transferred to a shift register 75 by a signal $S_3$ and is shifted to the right in direction by shift pulses $S_4$. The number of shift pulses $S_4$ is counted by a counter 77 which previously is reset. If an information 1 overflows from the shift register 75, a flip-flop 76 is set. The content $V_1$ of counter 77 is stored in a register 81 by a signal $S_5$. The content of register 23 is again transferred to the shift register 75 by signal $S_3$ and is shifted in the left direction by shift pulses $S_4$. Counter 77 is then reset and counts the number of shift pulses $S_4$. When an information 1 overflows from the shift register 75, a flip-flop 74 is set. The content $V_2$ of counter 77 is stored in a register 82 by a signal $S_6$. The content $V_1$ and $V_2$ of register 81 and 82 are compared with each other by a comparator 83.

If $V_1 > V_2$, signals $V_1$ and $V_2$ are applied to an arithmetic device 84 by a signal $X_1$ from comparator 83. The result $(V_1 - V_2)/2$ is obtained as a signal $Y_1$ by arithmetic device 84. If $V_1 \geq V_2$, signals $V_1$ and $V_2$ are applied to an arithmetic device 86 by a signal $X_2$ from comparator 83. The result $(V_2 - V_1)/2$ is obtained as a signal $Y_2$ by arithmetic device 86. Signal $Y_1$ or $Y_2$ is then applied to the counter 77 by a signal $S_7$ so that the shift register 75 is shifted in the right or left direction in response to signal $X_1$ or $X_2$, respectively.

Furthermore, the content JS of register 30 is transferred to address register 11 by a signal $S_8$. Pattern information of one vertical scanning line is read out from the pattern memory 13 in accordance with an address in register 11 and is stored in register 14.

The content of register 14 is transferred to the shift register 75 by a signal $S_9$ and is shifted in the right or left direction in accordance with the number stored in counter 77. In other words, the numerical values $Y_1$ or $Y_2$ stored in counter 77 represent the deviation of the center of the character pattern on a vertical scanning line from the center of the storage area in register 75. Furthermore, the signals $X_1$ or $X_2$ from the comparator 83 represent the direction of the deviation. Since the shift register pulses $S_4$ and $X_1$ and $X_2$ are applied to register 75 (not shown in the drawing) the content of shift register 75 is shifted by shift pulses $S_4$ in the right or left directions corresponding to the signals $X_1$ or $X_2$. At the same time, the content of counter 77 is reduced by one for each shift pulse $S_4$ and the shift pulse $S_4$ is no longer applied to the shift register 75 when the content of counter 77 becomes zero. Therefore, the content of register 75 is shifted by the value $Y_1$ or $Y_2$ until the center of the character pattern in the vertical direction coincides with the center of the storage area of the register 75. After shifting, the content of the shift register 75 is transferred to a memory register 73 by a signal $S_{10}$ and is then stored in a desired area of the pattern buffer 6 in accordance with the address in register 70.

The contents of registers 11 and 70 are increased by one and a subsequent pattern portion is read out from the pattern memory 13 and is stored in the pattern buffer 6. Such operations are repeated (EX − JS) times, thereby segmenting one character pattern and storing it in the pattern buffer 6.

When a subsequent character pattern is segmented, the content of register 16 shown in FIG. 5 is increased by one and the end terminal of a subsequent character frame is transferred from the table 18 to register 19. Furthermore, the content SS of register 10 is transferred to register 11 by signal B and scanning for segmentation is started. When a frame is found to be blank, as recognized by signals $K_2$ or $N_2$, the above-described operations are not performed.

The system according to this invention is applicable to segmentation of a figure pattern, for example, a logical notation which has a constant size. According to this invention, the following advantages are obtained:

1. Since the end terminal position of a character frame is previously stored in a table, a character pattern is correctly segmented even if the position and size of the character frame change.

2. A character pattern is correctly segmented even if this character pattern has a plurality of subpatterns such as a katakana "ﾉ\".

3. When nothing is within a character frame, a blank can be recognized.

4. A character pattern is correctly segmented even if this character pattern extends over a character frame.

5. Even if a noise is included in a character frame, only the character pattern portion is segmented.

6. A character pattern can be segmented even if this character pattern is connected with an adjacent subsequent character pattern.

7. A segmented character pattern is stored in a desired area of a pattern buffer so that the center of this character pattern coincides with the center of this area.

While we have shown and described several embodiments in accordance with this invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A pattern segmenting system comprising:
   a memory for storing at least one information pattern;
   first means for reading out the information pattern from said memory;
   second means for detecting the start and end positions of at least one subpattern in the information pattern read out from said first means;
   third means for calculating the center position of the subpattern in accordance with the start and end positions detected by said second means;
   fourth means for storing the end position of a selected pattern frame;
   fifth means for detecting whether or not the center position of the subpattern is within the selected pattern frame by comparing said center position with said end position of said selected pattern frame; and
   sixth means for segmenting the subpattern only when the center position of the subpattern is within the selected pattern frame and for regarding the frame as blank when the center position of the subpattern is outside the selected pattern frame.

2. A pattern segmenting system according to claim 1, which further includes a second memory for storing the information pattern segmented by said sixth means.

3. A pattern segmenting system according to claim 2, which further includes eighth means for storing the information pattern in said second memory so that the center of the information pattern coincides with the center of a predetermined storage area in said second memory.

4. A pattern segmenting system according to claim 1, which further includes seventh means responsive to said second means for calculating the size of the subpattern and for regarding the subpattern as a noise when the size of the subpattern in the information pattern is smaller than a predetermined value.

5. A pattern segmenting system according to claim 1, which further includes eighth means for indicating whether or not the information pattern in the selected pattern frame includes a plurality of subpatterns, and in which said sixth means includes means responsive to said eighth means for segmenting the information pattern except for the last subpattern thereof.

6. A pattern segmenting system according to claim 1, which further includes eighth means for detecting that the width of the subpattern is more than a predetermined value, and in which said sixth means has means for segmenting the subpattern separated at a predetermined position as the information pattern in the selected pattern frame in response to said eighth means.

7. A pattern segmenting system according to claim 1, wherein said sixth means includes means for segmenting the subpattern in the pattern frame subsequent to said selected pattern frame when the center position of the subpattern is outside the selected pattern frame.

8. A pattern segmenting system according to claim 1, which further includes eighth means for indicating whether or not the information pattern in the selected pattern frame includes a plurality of subpatterns, and in which said sixth means includes means for segmenting the plural subpatterns indicated by said eighth means as the information pattern in the selected pattern frame when the centers of the plural subpatterns are within the selected pattern frame.

* * * * *